US009387922B2

(12) United States Patent
Guinaldo Fernandez et al.

(10) Patent No.: US 9,387,922 B2
(45) Date of Patent: Jul. 12, 2016

(54) MAIN SUPPORTING STRUCTURE OF AN AIRCRAFT LIFTING SURFACE

(71) Applicant: Airbus Operations S.L., Getafe (Madrid) (ES)

(72) Inventors: Enrique Guinaldo Fernandez, Getafe (ES); Francisco Cruz Dominguez, Getafe (FR); Francisco Javier Honorato Ruiz, Getafe (ES); Paula Mas Mas, Getafe (ES); Iker Velez de Mendizabal Alonso, Getafe (ES); Carlos Garcia Nieto, Getafe (ES)

(73) Assignee: Airbus Operations S.L., Getafe (ES)

( * ) Notice: Subject to any disclaimer, the term of this patent is extended or adjusted under 35 U.S.C. 154(b) by 212 days.

(21) Appl. No.: 14/083,531

(22) Filed: Nov. 19, 2013

(65) Prior Publication Data
US 2014/0151505 A1 Jun. 5, 2014

(30) Foreign Application Priority Data

Nov. 28, 2012 (EP) ..................................... 12382470

(51) Int. Cl.
*B64C 3/18* (2006.01)
*B64C 5/02* (2006.01)

(52) U.S. Cl.
CPC ................. *B64C 3/187* (2013.01); *B64C 3/185* (2013.01); *B64C 5/02* (2013.01); *Y10T 29/49622* (2015.01)

(58) Field of Classification Search
CPC .......... B64C 3/187; B64C 3/185; B64C 5/02; Y10T 29/49622
See application file for complete search history.

(56) References Cited

U.S. PATENT DOCUMENTS

| | | | | |
|---|---|---|---|---|
| 1,752,701 A | | 4/1930 | Semmes | |
| 2,567,124 A | * | 9/1951 | Roberts | B64C 3/18 244/124 |
| 6,786,452 B2 | * | 9/2004 | Yamashita | B64C 3/18 244/177 R |
| 7,641,147 B2 | * | 1/2010 | Schmidt | B64C 3/18 244/123.1 |
| 2005/0236524 A1 | | 10/2005 | Sarh | |
| 2008/0283675 A1 | | 11/2008 | Sagredo | |
| 2012/0034093 A1 | * | 2/2012 | Vertel | B64C 3/187 416/229 R |
| 2014/0103160 A1 | * | 4/2014 | Jareno Diz Lois | B64C 3/18 244/1 A |
| 2014/0138486 A1 | * | 5/2014 | Fernadez | B64C 3/18 244/123.1 |
| 2014/0151506 A1 | * | 6/2014 | Fernandez | B29C 70/30 244/123.1 |

FOREIGN PATENT DOCUMENTS

DE 102004058910 6/2006
EP 1988013 11/2008

OTHER PUBLICATIONS

European Search Report, Apr. 23, 2013.

* cited by examiner

*Primary Examiner* — Valentina Xavier
(74) *Attorney, Agent, or Firm* — Greer, Burns & Crain Ltd.

(57) ABSTRACT

An aircraft lifting surface with a main supporting structure comprising upper and lower faces defining its aerodynamic profile, front and rear faces oriented towards, respectively, the leading and trailing edges, a first set of transverse ribs extended from the front face to the rear face and a second set of transverse ribs crossing the front face and/or the rear face. The integration of leading and trailing edge ribs in the main supporting structure allows a weight and cost reduction of aircraft lifting surfaces. A manufacturing method of said main supporting structure is also disclosed.

7 Claims, 7 Drawing Sheets

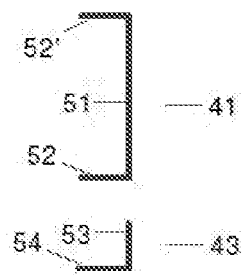
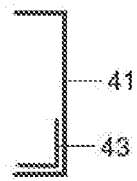
FIG. 6c
FIG. 6d
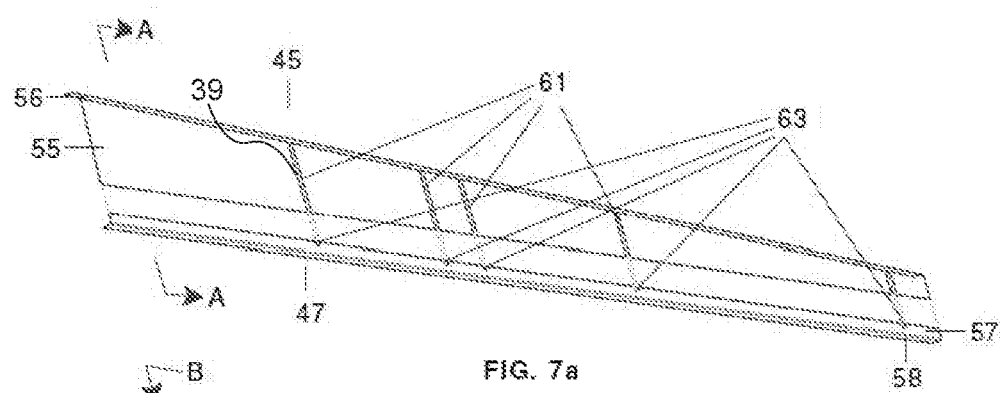
FIG. 7a
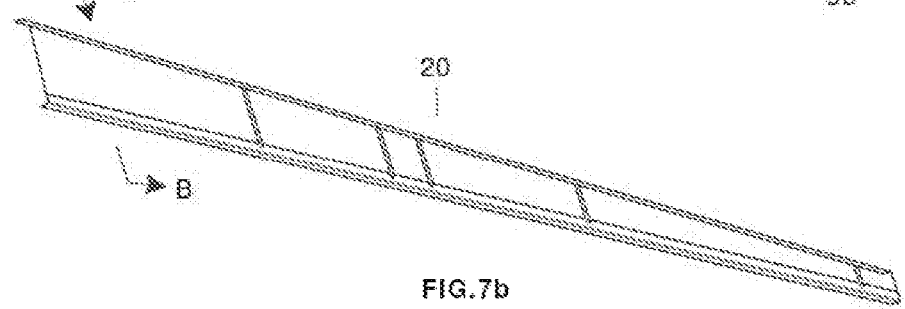
FIG. 7b
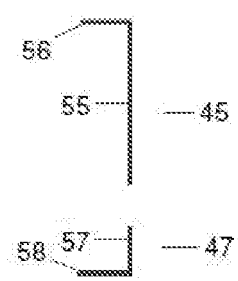
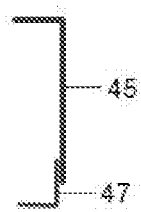
FIG. 7d
FIG. 7e

MAIN SUPPORTING STRUCTURE OF AN AIRCRAFT LIFTING SURFACE

CROSS-REFERENCES TO RELATED APPLICATIONS

This application claims the benefit of the European patent application No. 12382470.8 filed on Nov. 28, 2012, the entire disclosures of which are incorporated herein by way of reference.

BACKGROUND OF THE INVENTION

The present invention refers to an aircraft lifting surface and more in particular to its main supporting structure.

An aircraft lifting surface usually comprises a torsion box as its main supporting structure. For example, FIGS. 1a, 1b and 1c show a known horizontal tail plane (HTP) structured by leading edges 11, torsion boxes 13 and trailing edges 15 with control surfaces (flaps, elevators, rudders, etc.).

The structural elements of torsion boxes 13 are upper and lower skins 21, 23 stiffened by longitudinal stringers, a front spar 18, a rear spar 20 and transverse ribs 25 attached to the front and rear spars 18, 20 and to the upper and lower skins 21, 23 in order to keep the torsion box shape and reinforce the load introductions areas linked to the HTP structural arrangement in the aircraft and to the actuators for handling the HTP control surfaces.

The leading edge 11 is the structure responsible for keeping the aerodynamic surface with a torsion box surface, for supporting the static or cyclic structural loads involved and for protecting the torsion box from bird impacts. It is the part of the lifting surface that first contacts the air and the foremost edge of an airfoil section.

The leading edge 11 comprises, on the one side, several ribs 29, called leading edge ribs attached to the front spar 18 of the torsion box 13 and, on the other side, the leading edge cover 27—commonly known as "nose"—attached to the leading edge ribs 29 and to the flanges of the front spar 18 in order to keep the overall aerodynamic shape of the lifting surface. Leading edges further comprising additional elements like spars, vertical stiffeners and sandwich cores are also known in the art.

Similarly the trailing edge 15 comprises, on the one side, several ribs, called trailing edge ribs attached to the rear spar 20 of the torsion box 13 and, on the other side, a trailing edge cover 28 attached to the trailing edge ribs and to the flanges of the rear spar 20 or to the edge of the torsion box in order to keep the overall aerodynamic shape of the HTP.

A known assembling method of this HTP comprises the following steps:
  Assembling the torsion box 13.
  Joining the trailing edge ribs to the torsion box 13.
  Joining the trailing edge cover 28 to the torsion box 13 and to the trailing edge ribs.
  Joining the leading edge ribs 29 to the torsion box 13.
  Joining the leading edge cover 27 to the torsion box 13 and to the leading edge ribs 29.

Due to the amount of different components to be assembled, the manufacturing of this HTP (and the same applies to other lifting surfaces) is a complex and expensive process and consequently the aeronautics industry is constantly demanding new proposals and new manufacturing methods that improve efficiency, reduce the amount of mechanical joints and reduce costs of aircraft tail planes and other aircraft lifting surfaces.

The present invention is directed to the attention of that demand.

SUMMARY OF THE INVENTION

It is an object of the present invention to provide a main supporting structure of an aircraft lifting surface allowing a cost and weight reduction with respect to a comparable structure of known aircraft lifting surfaces.

It is another object of the present invention to provide a manufacturing method of said main supporting structure.

In one aspect, these and another objects are met by a main supporting structure comprising an upper face and a lower face defining its aerodynamic profile, a front face and a rear face oriented towards, respectively, the leading and trailing edges, a first set of transverse ribs extended from the front face to the rear face, a second set of transverse ribs crossing the front face and/or the rear face configured with upper and lower recesses in their crossing zones with the front face and/or with the rear face; the front face and/or the rear face being configured with slot holes in their crossing zones with the second set of transverse ribs.

The ribs of the second set therefore integrate the ribs of known torsion boxes with the leading edge ribs and/or the trailing edge ribs required to keep the overall lifting surface shape, withstand required loads and support axes of movable surfaces. This integration allows a cost and weight reduction due to the fact that the amount of components of the main supporting structure is reduced and its assembly is simplified.

In one embodiment, the main supporting structure comprises upper and lower skins and front and rear spars in, respectively, their upper, lower, front and rear faces.

In another embodiment, the main supporting structure comprises only two structural elements providing therefore a further level of integration. In one particular embodiment one of them is the upper or the lower face of the main supporting structure and the other is a single element integrating respectively the lower face or the upper face with the front and the rear faces. In another particular embodiment one of them is a single element integrating the upper face and the front face or the rear face and the other is a single element integrating the lower face and the rear face or the front face.

In another aspect, the above-mentioned objects are met by methods for manufacturing said main supporting structure.

In the configuration with upper and lower skins and front and rear spars the method comprises the following steps: a) providing all the components of the main supporting structure with the exception of the front spar and/or the rear spar which is crossed by a rib as individual elements made up of a composite material; b) providing the front spar and/or the rear spar which is crossed by a rib divided in first and second parts made up of a composite material; c) assembling the main supporting structure in the following sub-steps: c1) joining all the ribs to the upper skin and to the lower skin; c2) joining the front spar or the rear spar which is not crossed by a rib (if any) to the upper skin and to the lower skin and joining the first and second part of the front spar and/or the rear spar which is crossed by a rib to, respectively, the upper skin and the lower skin; c3) joining the first and second part of the front spar and/or the rear spar which is crossed by a rib between them.

In one embodiment, the front and rear spars have a C-shaped transversal section (and said first part a C-shaped or an L-shaped transversal section and said second part an L-shaped transversal section) so that their flanges can ensure a continuous load transfer.

In the configuration with two structural elements, the manufacturing method comprises the following steps: a) providing all the components of the main supporting structure with connecting flanges between them as individual elements made up of a composite material; b) assembling the main supporting structure in the following sub-steps: b1) joining all the ribs to the two structural elements; b2) joining the two structural elements between them.

Other desirable features and advantages of the invention will become apparent from the subsequent detailed description of the invention and the appended claims, in relation with the enclosed drawings.

BRIEF DESCRIPTION OF THE DRAWINGS

FIGS. 6c and 6d are, respectively, cross-sectional views of FIGS. 6a and 6b by the plans A-A and B-B.

FIGS. 7a and 7b are schematic perspective views of an embodiment of the two components of a rear spar of a main supporting structure of a HTP that are used in a manufacturing method according to the invention. FIGS. 7c and 7d are cross-sectional views of FIGS. 7a and 7b by the plans A-A and B-B.

DETAILED DESCRIPTION OF THE PREFERRED EMBODIMENTS

In the following detailed description reference is made to a HTP, but the invention is applicable to any lifting surface of an aircraft.

Figure 1A:
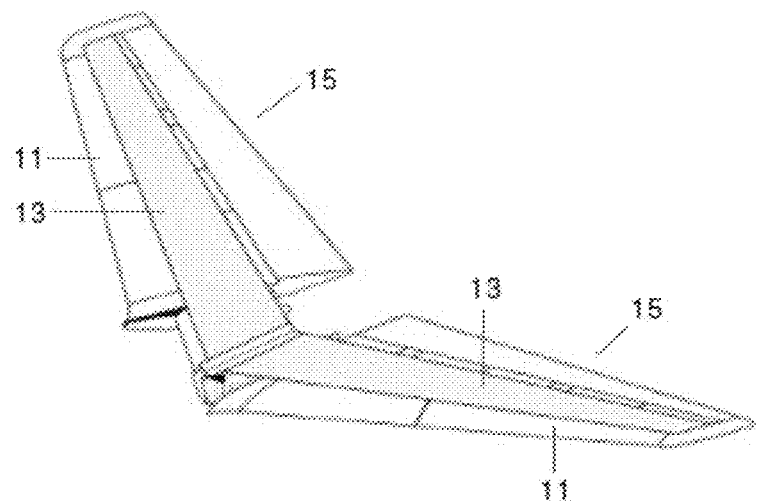
FIG. 1a is a perspective view of a known horizontal tail plane showing the torsion boxes, the leading edges and the trailing edges with control surfaces.
Figure 1B:
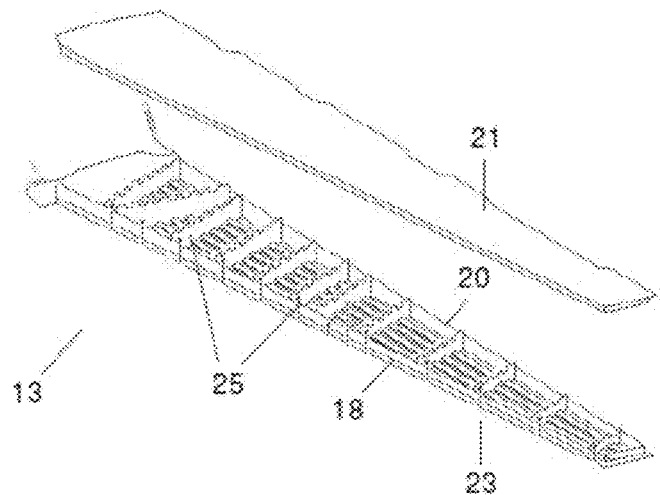
FIG. 1b is a perspective view of a known torsion box, where the upper skin has been moved upwards to improve the visibility inside the box.
Figure 1C:
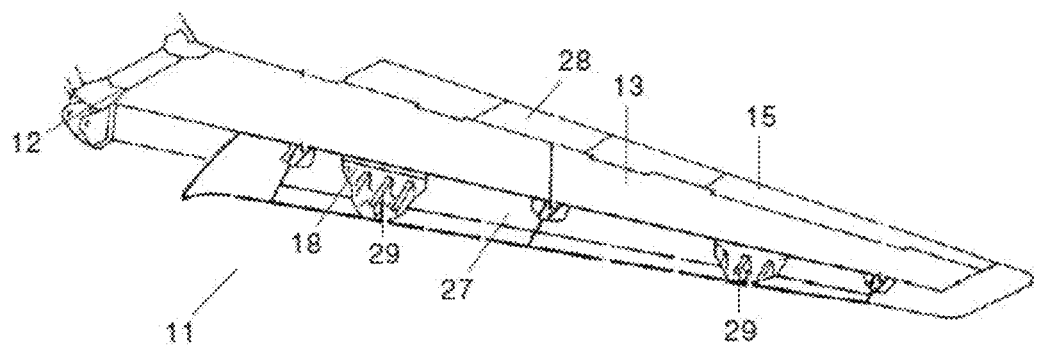
FIG. 1c is perspective view of one side of the horizontal tail plane of FIG. 1a with cutaways to improve the visibility of the leading edge structure showing the leading edge ribs and the leading edge profiles.
Figure 2A:
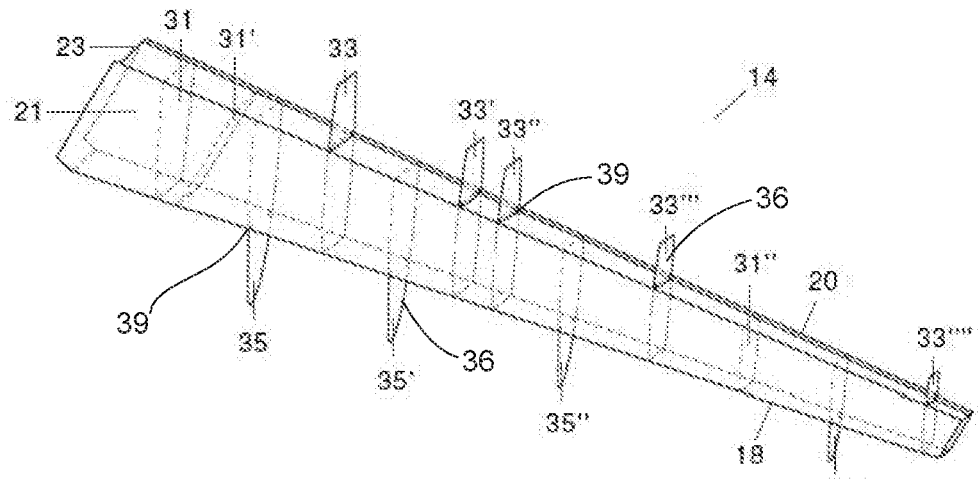
FIGS. 2a and 2b are respectively a schematic perspective view and a plan view of an embodiment of a main supporting structure of a HTP according to the invention.
Figure 2B:
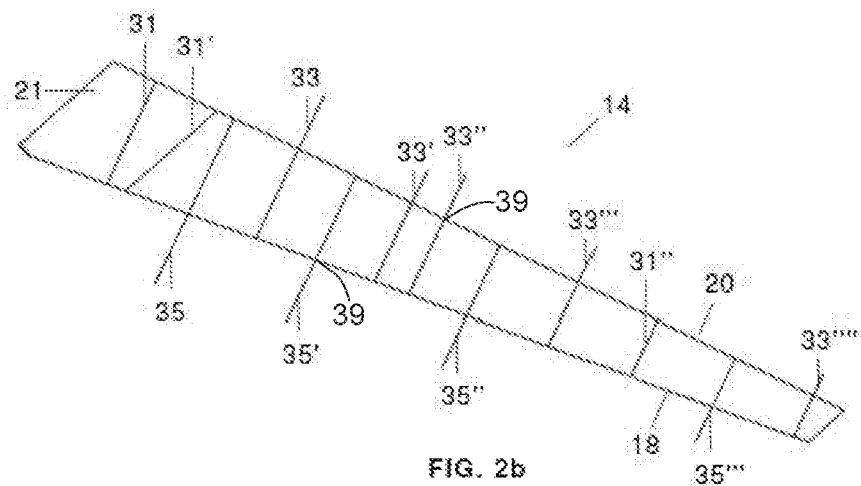

FIGS. 2a and 2b show an embodiment of main supporting structure 14 of a HTP according to the invention comprising the following structural elements:

A front spar 18 and a rear spar 20.

A first set of transverse ribs 31, 31', 31'' extended from the front spar 18 to the rear spar 20.

A second set of transverse ribs 36 including first sub-set of ribs 33, 33', 33'', 33''', 33'''' extended from the front spar 18 to the trailing edge region. They include sections in the trailing edge region acting as trailing edge structural ribs and as trailing edge bearing ribs supporting hinge lines of control surfaces.

the second set of transverse ribs 36 includes a second sub-set of ribs 35, 35', 35'', 35''' extended from the rear spar 20 to the leading edge region. They include sections in the leading edge region acting as leading edge structural ribs.

An upper skin 21 and a lower skin 23.

This main supporting structure 14 comprises all the ribs needed for complying with the structural requirements of the HTP and allows improving the HTP efficiency and its manufacturing costs.

Figure 3:
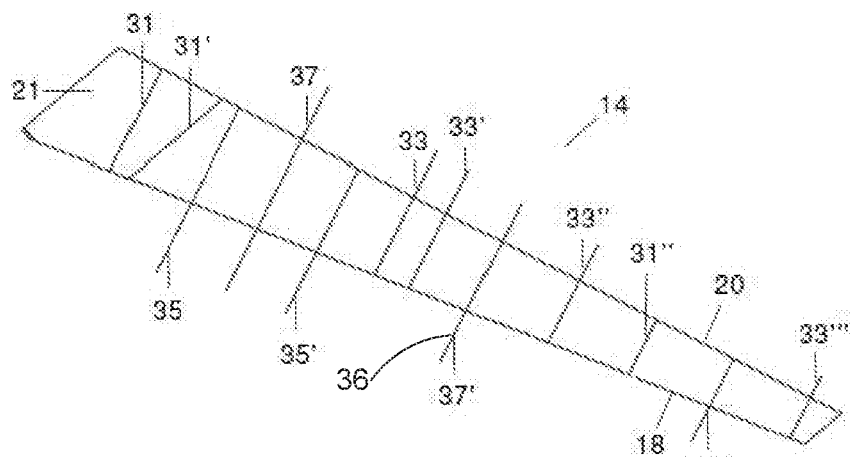
FIG. 3 is a schematic plan view of another embodiment of a main supporting structure of a HTP according to the invention.

FIG. 3 illustrates another embodiment of a main supporting structure 14 according to the invention wherein the second set of transverse ribs 36 includes a third sub-set of ribs 37, 37' extended from the leading edge region to the trailing edge region that include sections in both regions acting as structural ribs.

Figure 4:
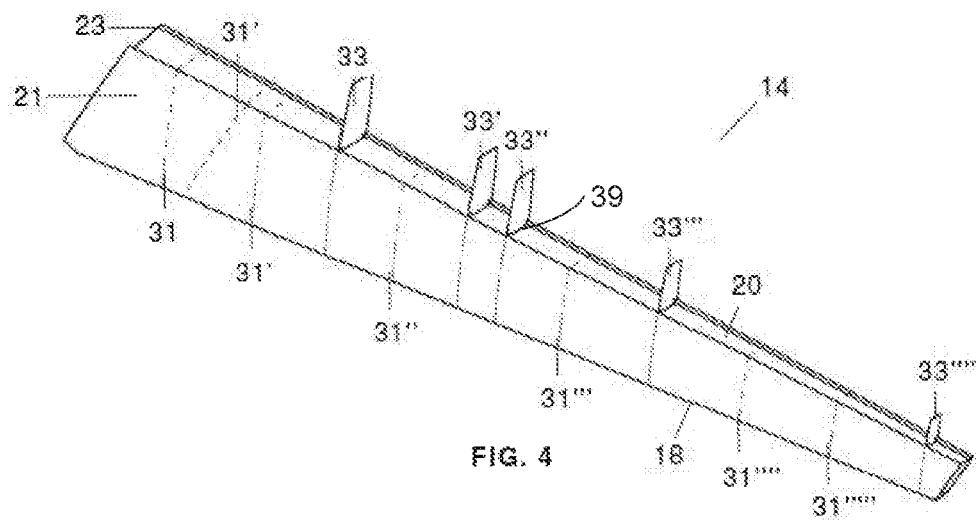
FIG. 4 is a schematic perspective view of another embodiment of a main supporting structure of a HTP according to the invention.

FIG. 4 illustrates another embodiment of a main supporting structure 14 according to the invention comprising only a first set of ribs 31, 31', 31'', 31''', 31' extended from the front spar 18 to the rear spar 20 and a first sub-set of ribs 33, 33', 33'', 33''', 33'''' extended from the front spar 18 to the trailing edge region.

In another embodiment (not shown) the main supporting structure comprises only a first set of ribs extended from the front spar 18 to the rear spar 20 and a second sub-set of ribs extended from the rear spar 20 to the leading edge region.

The upper and lower skins 21, 23 and the first set of ribs have a similar configuration to the same elements of the known HTP mentioned in the background.

Figure 5A:
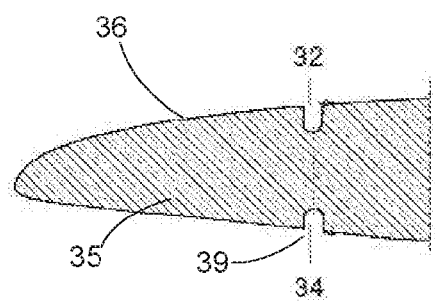
FIGS. 5a and 5b are side views of rib sections belonging to the main structure of a HTP according to the invention crossing respectively the front spar and the rear spar.
Figure 5B:
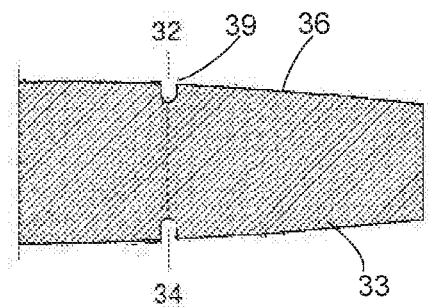
Figure 6A:
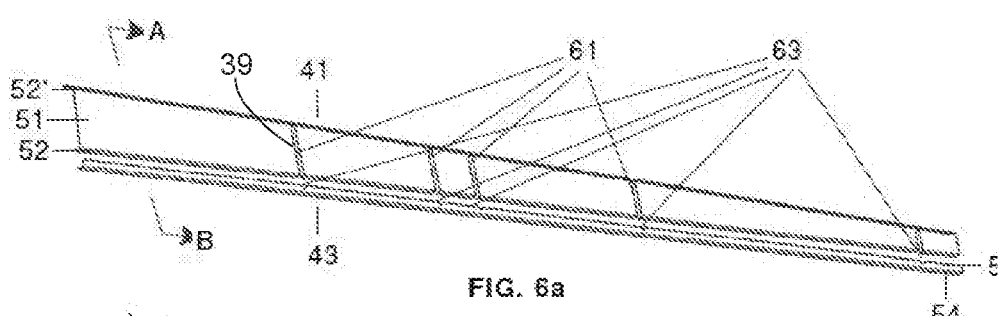
FIGS. 6a and 6b are schematic perspective views of an embodiment of the two components of a front spar of a main supporting structure of a HTP that are used in a manufacturing method according to the invention.
Figure 6B:
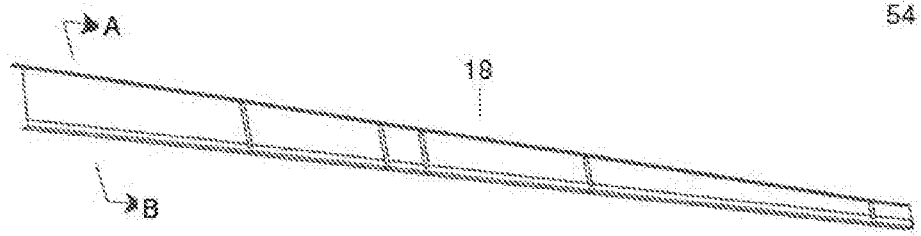

The contour of the second set ribs 36 including the above-mentioned first 33, second 35 and third 37 sub-sets includes upper and lower recesses 32, 34 in their crossing zones 39 with the front spar 18 and/or the rear spar 20 as illustrated in FIGS. 5a and 5b in order to avoid any clash with both spar caps.

The front and rear spars 18, 20 are configured with slot holes 61 in the places foreseen for their crossing zones 39 with ribs.

The HTP according to the invention also comprises covers 27, 28 of the leading and trailing edges 11, 15 defining their aerodynamic surfaces.

The manufacturing method of a main supporting structure according to the invention comprises a first stage of manufacturing separately all its components and a second assembly stage.

The upper and lower skin 21, 23, all the ribs and a front spar 18 or a rear spar 20 not crossed by any rib are manufactured with their desired final shape.

The front spar 18 and/or the rear spar 20 crossed by at least a rib are manufactured in two parts.

In the embodiment shown in FIGS. 6a, 6b, 6c and 6d the front spar 18 is divided in a first C-shaped part 41 configured by a web 51 and two flanges 52, 52' and a second L-shaped part 43 configured by a web 53 and a flange 54, both webs 51, 53 including slot holes 61, 63. A rear spar 20 can also have this configuration.

In the embodiment shown in FIGS. 7a, 7b, 7c and 7d the rear spar 20 is divided in a first L-shaped part 45 configured by a web 55 and a flange 56 and a second L-shaped part 47 configured by a web 57 and a flange 58, both webs 55, 57 including slot holes 61, 63. A front spar 18 can also have this configuration.

All these elements are made up of composite materials, and particularly of CFRP (Carbon Fiber Reinforced Plastic), according to a known method comprising the following steps.

In a first step, a flat lay-up of composite prepreg plies for each element is prepared. Then a laminated preform of the element with the required shape is obtained by means of a classical hot-forming process (or by a press-forming process when high curvatures are involved). After getting the required shape, the laminated preform is cured in a male or female tooling depending on the tolerances required and the overall manufacturing cost. Finally, after the curing cycle, the element contours are trimmed getting the final geometry, and then the element is inspected by an ultrasonic system to assure its quality.

Figure 8A:
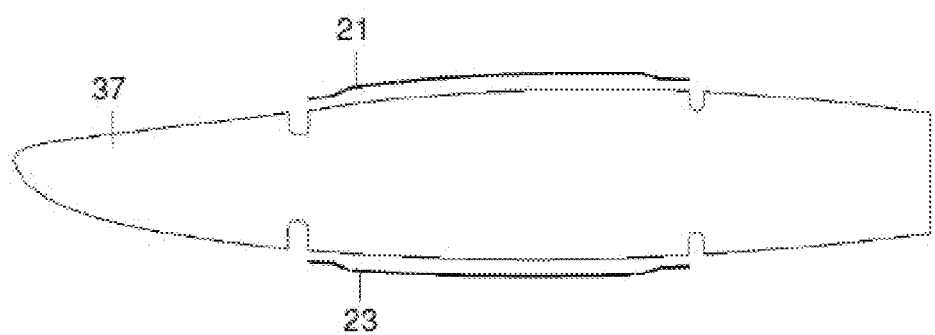
FIGS. 8a, 8b and 8d illustrate the assembly of the main supporting structure of a HTP in manufacturing methods according to the invention.

The assembly stage of the main supporting structure 14 according to a manufacturing method of the invention comprises the following steps:
  Joining all the ribs to the upper skin 21 and to the lower skin 23 by means of, for example, rivets. See FIG. 8a for a rib 37 extended from the leading edge region to the trailing edge region (the rivets are not shown).
  Joining the front spar 18 and the rear spar 20 to the upper skin and the lower skin.

Figure 8B:
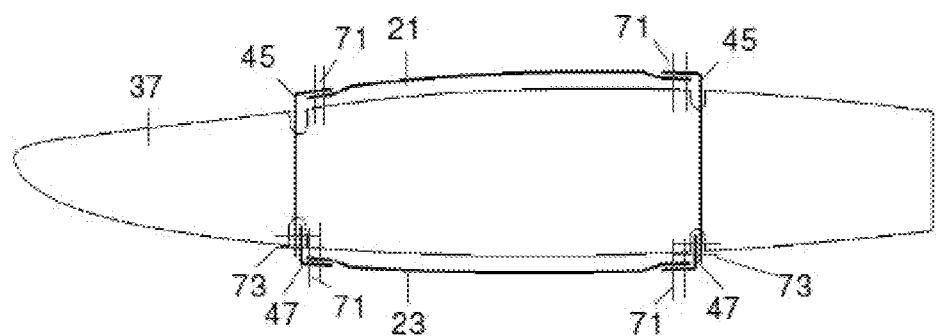
Figure 8C:
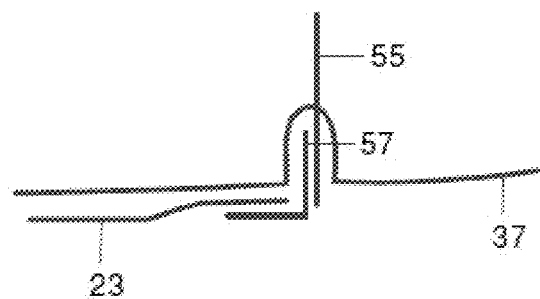
FIGS. 8c and 8e are enlarged views of one of the joints of the elements of the main supporting structure.

FIGS. 8b and 8c illustrate an embodiment where the front spar 18 and the rear spar 20 are divided in first and second parts 45, 47 having an L-shaped configuration. The first and second parts 45, 47 are joined to, respectively, the upper skin 21 and the lower skin 23 by means of rivets 71 and they are joined between them by their webs 55, 57 by means of rivets 73.

Figure 8D:
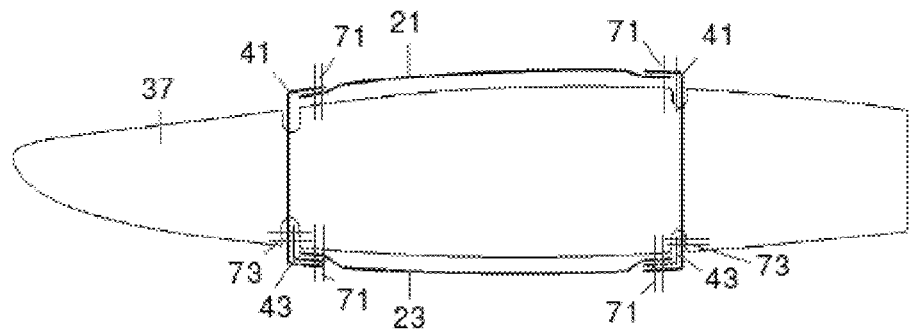
Figure 8E:
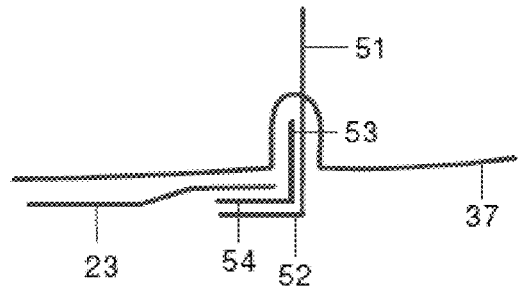

FIGS. 8d and 8e illustrate an embodiment where the front spar 18 and the rear spar 20 are divided in first and second parts 41, 43 having, respectively, a C-shaped and an L-shaped configuration. The first and second parts 41, 43 are joined to, respectively, the upper skin 21 and the lower skin 23 by means of rivets 71 and they are joined between them by their webs 51, 53 by means of rivets 73 (and also by their flanges 52, 54 by means of the rivets 71 together with the lower skin 23).

Figure 9:
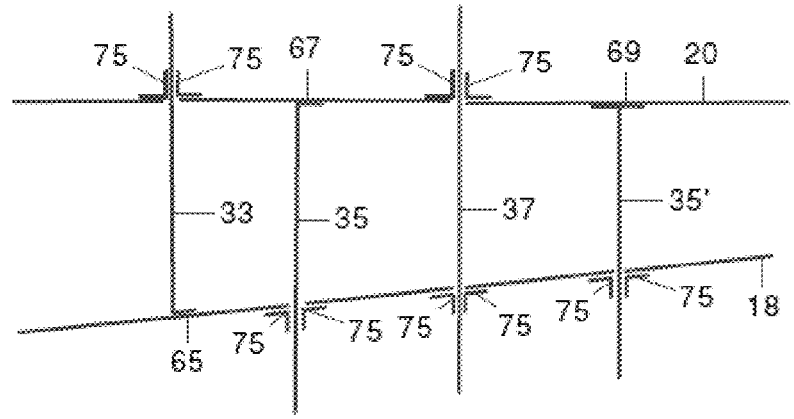
FIG. 9 is a sketch of a plan view of the joining of a rib to the front and rear spars of the main supporting structure of a HTP in a manufacturing method according to the invention.

The ribs can also be joined to the spars. FIG. 9 shows four cases of ribs crossing spars:
  A rib 37 crossing the front spar 18 and the rear spar 20 which is joined to them by, preferably, four angles or cleats 75 joined to their outer surfaces.
  A rib 33 crossing the rear spar 20 which is joined to the front spar 18 by a foot 65 and to the rear spar 20 by, preferably, two angles or cleats 75 joined to their outer surfaces.
  A rib 35 crossing the front spar 18 which is joined to the rear spar 20 by a foot 67 and to the front spar 18 by, preferably, two angles or cleats 75 joined to their outer surfaces.
  A rib 35' crossing the front spar 18 which is joined to the rear spar 20 by a T-shaped foot 69 and to the front spar 18 by, preferably, two angles or cleats 75 joined to their outer surfaces.

In all cases the web of the rib is joined to the web of the front spar 18 and/or to the web of the rear spars 20 by means of said angles or cleats 75.

Figure 10:
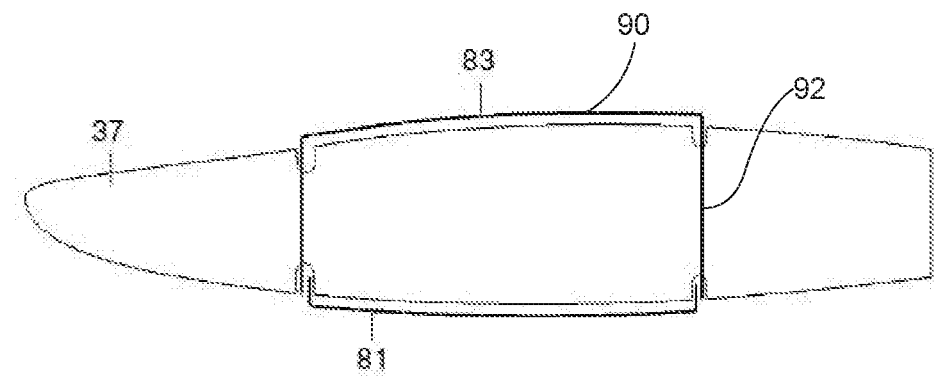
FIGS. 10, 11 and 12 are schematic views of other configurations of the main supporting structure of a HTP according to the invention.

FIG. 10 shows an embodiment of a main supporting structure of a HTP according to the invention comprising a first structural element 83 that integrates an upper face 90 and front 91 and rear 92 faces and a second structural element 81 comprising a lower face 93 plus connecting flanges with the first structural element 83.

Figure 11:
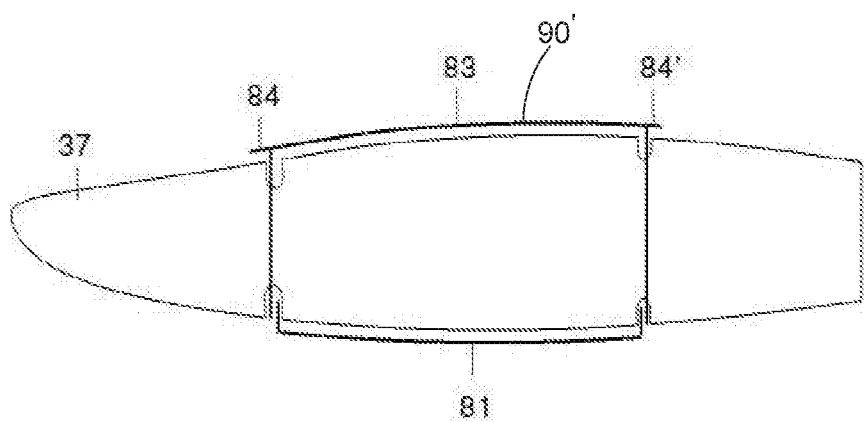

The only difference between the embodiments of FIGS. 10 and 11 is that the upper face 90' of the latter comprises two external flanges 84, 84' for integrating other elements.

Figure 12:
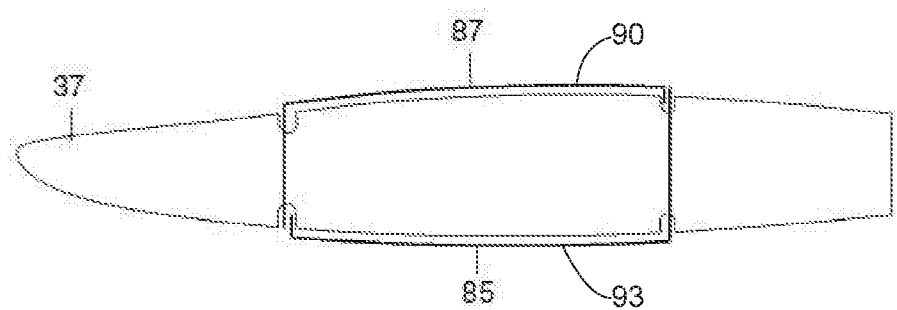

FIG. 12 shows another embodiment of a main supporting structure of a HTP according to the invention comprising a first structural element 87 that integrates the upper face 90 and the front face 91 and a second structural element 85 that integrates the lower face 93 and the rear face 92. The upper 90 and lower 93 faces include connecting flanges with the other structural element.

As in the front and rear spar of the above-mentioned embodiments, the front 91 and rear 92 faces of the first structural elements 83, 87 comprise slot holes in their crossing zones with those ribs that extend outside of them.

The assembly stage of the main supporting structure shown in FIGS. 10, 11 and 12 according to the manufacturing method of the invention comprises the following steps:
  Joining all the ribs to the first and second structural element 83, 81; 87; 85.
  Joining the first and second structural element 83, 81; 87; 85 between them.

Although the present invention has been described in connection with various embodiments, it will be appreciated from the specification that various combinations of elements, variations or improvements therein may be made, and are within the scope of the invention.

The invention claimed is:

1. An aircraft lifting surface comprising:
  a main supporting structure and leading and trailing edges;
  the main supporting structure comprising upper and lower faces defining its aerodynamic profile, front and rear faces oriented towards, respectively, the leading and trailing edges and a first set of transverse ribs extended from the front face to the rear face;
  the leading and trailing edges comprising covers defining their aerodynamic profile joined to the main supporting structure,
  the main supporting structure further comprising a second set of transverse ribs crossing at least one of the front face and the rear face;
  the second set of transverse ribs being configured with upper and lower recesses in their crossing zones with at least one of the front face and with the rear face;
  at least one of the front face and the rear face being configured with slot holes in their crossing zones with the second set of transverse ribs.

2. The aircraft lifting surface according to claim 1, wherein said second set of transverse ribs comprises one or more of the following sub-sets, each sub-set comprising one or more members:
  a first sub-set of transverse ribs extended from the front face to a trailing edge region, crossing the rear face;
  a second sub-set of transverse ribs extended from the rear face to a leading edge region, crossing the front face;
  a third sub-set of transverse ribs extended from the leading edge region to the trailing edge region, crossing the front and rear faces.

3. The aircraft lifting surface according to claim 1, wherein the covers of the leading and trailing edges are also joined to sections of the second set of transverse ribs located, respectively, in at least one of leading and trailing edge regions.

4. The aircraft lifting surface according to claim 1, wherein the main supporting structure comprises an upper skin and a lower skin in, respectively, the upper and rear faces of the main supporting structure, and a front spar and a rear spar in, respectively, the front and rear faces of the main supporting structure.

5. The aircraft lifting surface according to claim 4, wherein the front spar and the rear spar are configured with a C-shaped transversal section.

6. The aircraft lifting surface according to claim 1, wherein the main supporting structure comprises a second structural element comprising one of the upper face and the lower face and a first structural element comprising all other faces.

7. The aircraft lifting surface according to claim 1, wherein the main supporting structure comprises a second structural element comprising one of the upper and the lower face and one of the front face and the rear face and a first structural element comprising the other of the upper and the lower face and the other of the front face and the rear face.

* * * * *